United States Patent
Smith

(10) Patent No.: US 7,035,428 B1
(45) Date of Patent: Apr. 25, 2006

(54) WORKPIECE AUTHENTICATION BASED UPON ONE OR MORE WORKPIECE IMAGES

(75) Inventor: Joshua R. Smith, Cambridge, MA (US)

(73) Assignee: The Escher Group, Ltd., Cambridge, MA (US)

( * ) Notice: Subject to any disclaimer, the term of this patent is extended or adjusted under 35 U.S.C. 154(b) by 0 days.

(21) Appl. No.: 09/719,430

(22) PCT Filed: Apr. 19, 2000

(86) PCT No.: PCT/US00/10535

§ 371 (c)(1),
(2), (4) Date: Dec. 12, 2000

(87) PCT Pub. No.: WO00/65541

PCT Pub. Date: Nov. 2, 2000

Related U.S. Application Data

(60) Provisional application No. 60/130,666, filed on Apr. 23, 1999, now abandoned.

(51) Int. Cl.
*G06K 9/00* (2006.01)
(52) U.S. Cl. ........................ 382/101; 382/141; 340/5.86
(58) Field of Classification Search ................ 382/100, 382/101, 143, 298, 263, 264; 340/5.86
See application file for complete search history.

(56) References Cited

U.S. PATENT DOCUMENTS

| | | | |
|---|---|---|---|
| 4,218,674 A | 8/1980 | Brosow et al. | 340/149 |
| 4,423,415 A | 12/1983 | Goldman | 340/825.34 |
| 4,489,318 A | 12/1984 | Goldman | 340/825.34 |
| 4,546,352 A | 10/1985 | Goldman | 340/825.34 |
| 4,568,936 A | 2/1986 | Goldman | 340/825.34 |
| 4,651,150 A | 3/1987 | Katz et al. | 340/825.34 |
| 4,656,473 A | 4/1987 | Goldman et al. | 340/825.34 |
| 4,663,622 A | 5/1987 | Goldman | 340/825.34 |
| 4,675,669 A | 6/1987 | Goldman | 340/825.34 |
| 4,677,435 A | 6/1987 | Causse D'Agraives et al. | 340/825.31 |
| 4,686,527 A | 8/1987 | Goldman | 340/825.34 |
| 4,689,477 A | 8/1987 | Goldman | 235/380 |
| 4,725,718 A | 2/1988 | Sansone et al. | 235/495 |
| 4,734,695 A | 3/1988 | Goldman | 340/825.34 |
| 4,739,322 A | 4/1988 | Katz et al. | 340/825.34 |
| 4,743,747 A | 5/1988 | Fougere et al. | 235/494 |
| 4,785,290 A | 11/1988 | Goldman | 340/825.34 |
| 4,795,890 A | 1/1989 | Goldman | |
| 4,807,287 A * | 2/1989 | Tucker et al. | 713/179 |
| 4,811,408 A | 3/1989 | Goldman | 382/2 |

(Continued)

FOREIGN PATENT DOCUMENTS

EP 0878778 A2 11/1998

(Continued)

OTHER PUBLICATIONS

A Robust Content Based Digital Signature For Image Authentication, Schneider et. al, Columbia University, Image and Advanced Television Laboratory, 1996 IEEE, pp. 227-230.

(Continued)

*Primary Examiner*—Samir Ahmed
*Assistant Examiner*—Charles Kim
(74) *Attorney, Agent, or Firm*—Cesari and McKenna, LLP

(57) ABSTRACT

A workpiece authentication technique is provided. The technique bases workpiece authentication upon intrinsic physical characteristics of the workpiece, including one or more images of topographical appearance of at least one portion of the workpiece.

4 Claims, 7 Drawing Sheets

U.S. PATENT DOCUMENTS

| | | | | |
|---|---|---|---|---|
| 4,816,824 A | | 3/1989 | Katz et al. | 340/825.34 |
| 4,820,912 A | | 4/1989 | Samyn | 235/449 |
| 4,837,840 A | | 6/1989 | Goldman | 382/7 |
| 5,098,130 A | | 3/1992 | Mikhail | 283/71 |
| 5,291,560 A | | 3/1994 | Daugman | 382/2 |
| 5,295,196 A | * | 3/1994 | Raterman et al. | 382/135 |
| 5,325,167 A | | 6/1994 | Melen | 356/71 |
| 5,481,628 A | * | 1/1996 | Ghaderi | 382/261 |
| 5,521,984 A | | 5/1996 | Denenberg et al. | 382/209 |
| 5,686,720 A | * | 11/1997 | Tullis | 250/208.1 |
| 5,845,002 A | * | 12/1998 | Heck et al. | 382/110 |
| 5,850,306 A | * | 12/1998 | Fukutome et al. | 359/204 |
| 5,974,150 A | | 10/1999 | Kaish et al. | |
| 6,072,538 A | * | 6/2000 | Keating | 348/625 |
| 6,611,599 B1 | * | 8/2003 | Natarajan | 380/203 |

FOREIGN PATENT DOCUMENTS

| | | |
|---|---|---|
| WO | 96/30878 | 10/1996 |
| WO | 97/24699 | 7/1997 |

OTHER PUBLICATIONS

PCT Notification of Transmittal of the International Search Report of the Declaration, in corresponding PCT application number, mailed on Jul. 25, 2000, pp. 1-3.

PCT International Search Report, in corresponding PCT application, mailed on Jul. 25, 2000, pp. 1-4.

Graybeal and McFate, "Getting Out of the STARTing Block", Scientific American, Dec. 1989, vol. 261, No. 6, pp. 61-67.

* cited by examiner

WORKPIECE AUTHENTICATION BASED UPON ONE OR MORE WORKPIECE IMAGES

CROSS-REFERENCE TO RELATED APPLICATIONS

The subject application claims the priority of now abandoned U.S. Provisional Application Ser. No. 60/130,666, filed Apr. 23, 1999, entitled "Authentication Techniques Using Physical Uncopyability Primitive And Cryptographic Security." The entirety of the disclosure of said copending application is hereby incorporated by reference into the subject application. The subject application also is related to copending U.S. Design Patent Application Ser. No. 29/111,375, filed Sep. 24, 1999, entitled "Envelope With Postal Indicia And Related Items Having Unique Ornamental Appearance."

BACKGROUND OF THE INVENTION

1. Field of the Invention

The present invention relates generally to workpiece authentication techniques, and more specifically, to such techniques which involve imaging one or more portions of the workpiece to generate abstractions (e.g., numeric or alphanumeric strings) which represent random physical characteristics of the workpiece that may be used to determine whether the workpiece is authentic. Although the present invention will be described in connection with authenticating postal mailpieces based upon such abstractions, it should be appreciated that the present invention has other utilities, including authenticating workpieces other than postal mailpieces.

2. Brief Description of Related Prior Art

A value indicium is a symbol or token that indicates payment for a service. One example of a commonly-used value indicium is the "franking" or postal meter mark, which is placed on a postal mailpiece to indicate that a specified amount of money has been paid to post the mailpiece. Other examples of value indicia include paper currency, money orders, and tickets for cultural events and transportation.

Authentication indicia are symbols or tokens placed on or in a workpiece for use in determining the validity of the workpiece (e.g., whether the workpiece is authentic, as opposed to being a forgery). For example, legal documents, such as passports and driver's licenses often have validation stamps/seals from a certifying authority (CA), such as the government, placed on them that vouch for the authenticity of the legal documents.

In the past, if a postal franking mark on a postal mailpiece appeared to the ordinary observer (e.g., a postal clerk) to have been made by an authorized postal franking device, the mailpiece would be considered valid and would be posted without further inquiry into whether the mark was genuine. Unfortunately, improvements in photocopying, computer-based imaging and duplication technologies have rendered this prior art authentication technique unreliable, as they have permitted the unscrupulous to produce high quality forgeries of such franking marks that often appear genuine to the ordinary observer. This has driven interest in creating a postal franking mark whose authenticity can be determined without reference to its appearance, but instead can be determined using different criteria.

In one such conventional validation technique, the franking mark comprises an indicium that contains certain identifying information, such as the postage purchase date, meter identification number, franking sequence number, source and destination addresses of the mailpiece, and a cryptographic signature of the identifying information. According to this technique, mailpiece forgeries are detected based upon whether differences exist between the identifying information and the cryptographic signature in the indicium, and the actual identifying information of the mailpiece and the actual cryptographic signature of such actual identifying information.

Unfortunately, this latter validation technique is unable to thwart certain types of postal franking fraud. For example, if the identifying information and signature of a valid indicium of a first mailpiece are also valid for a second mailpiece, then the indicium of the first mailpiece may be fraudulently copied onto the second mail piece, and the fraudulent copying cannot be detected using this technique. Hereinafter, this type of fraud will be termed "double spending fraud."

Additionally, advances in networking technology have also permitted wide access to the data underlying such franking marks. For example, one could download such data using the Internet from a computer node storing such data (e.g., via email or a World Wide Web posting), and depending upon the manner in which this conventional technique is implemented, a large number of seemingly valid franking marks could be generated based upon such data. This further exacerbates the possibility and opportunity for such fraud.

In one prior art technique that is used to try to thwart double spending fraud, a database tracks use of value indicia and the respective identifying information therein. If two mailpieces have identical indicia, the database indicates this as a possible occurrence of double spending fraud.

Unfortunately, in practical implementation, this conventional double spending fraud detection technique requires use of a large database to track the indicia's identifying information. Disadvantageously, the burden and expense of maintaining and querying such a large database is undesirable. Also disadvantageously, this conventional fraud detection technique does not permit off-line verification of the indicia (i.e., not based upon information obtained via a network), and no mechanism is provided in this technique to determine which indicium among indicia determined to be identical is authentic.

Another prior art fraud problem arises when unauthorized use is made of data or digital tokens (e.g., stored in a computerized postal franking system's internal memory) that when supplied to the system cause it to produce otherwise valid authentication indicia. This type of fraud will be termed hereinafter "meter tampering double spending fraud."

Other examples of prior art are disclosed in e.g., Melen, U.S. Pat. No. 5,325,167 issued Jun. 28, 1994; Daugman, U.S. Pat. No. 5,291,560 issued Mar. 1, 1994; Causse D'Agraives et al., U.S. Pat. No. 4,677,435 issued Jun. 30, 1997; Samyn, U.S. Pat. No. 4,820,912 issued Apr. 11, 1989; Goldman, U.S. Pat. No. 4,423,415 issued Dec. 27, 1983; Goldman, U.S. Pat. No. 4,568,936 issued Feb. 4, 1986; Brosow, U.S. Pat. No. 4,218,674 issued Aug. 19, 1980; Deneberg et al., U.S. Pat. No. 5,521,984 issued May 28, 1996; Sansone, U.S. Pat. No. 4,725,718 issued Feb. 16, 1988; and Fougery et al., U.S. Pat. No. 4,743,747, issued May 10, 1988. Each of these patents is incorporated herein by reference in its entirety.

SUMMARY OF THE INVENTION

In accordance with the present invention, a workpiece authentication technique is provided that overcomes the aforesaid and other disadvantages of the prior art. A first aspect of the present invention provides an authentication indicium, using this technique. In one embodiment of the indicium, the indicium is placed on a workpiece for use in determining the workpiece's validity. The indicium comprises a set of one or more markings that correspond to or represent a unique cryptographic signature from a certifying authority (CA) and/or a numeric or alphanumeric string. The signature is based at least in part upon the string and a cryptographic key belonging to the CA. If the workpiece is valid, the string is based upon, at least in part, intrinsic physical characteristics of one or more portions of the workpiece. The physical characteristics include one or more images of surface topographical appearance of the one or more portions of the workpiece that result when the one or more portions of the workpiece are illuminated with electromagnetic radiation from different illumination positions relative to these portions of the workpiece.

The one or more markings may comprise a barcode, sequence of digits, and/or a spread-spectrum marking. The workpiece may be a postal mailpiece. If the workpiece is a valid postal mailpiece, the indicium may be printed on the mailpiece by an apparatus (e.g., a postal franking apparatus), and the string also may be representative of or comprise a postage value associated with the mailpiece (i.e., an amount of money paid to post the mailpiece) and/or an identification number used to identify the apparatus. The string may also be based upon respective numerical values (e.g., representative of one or more hash values) representative of the unique physical characteristics, postage value, and/or apparatus identification number.

The different positions from which the workpiece is illuminated with electromagnetic radiation may be at respective, different oblique angles of elevation and the same azimuthal angle relative to the one or more portions of the workpiece. Advantageously, by illuminating the workpiece from such oblique angles of elevation, the physical characteristics may be made more easily discernable than would otherwise be the case. Alternatively, the different positions may be at respective, different azimuthal angles and the same oblique angle of elevation relative to the one or more portions of the workpiece. The radiation with which the workpiece is illuminated may comprise coherent light. The one or more images may be generated from a portion of the illuminating radiation that is reflected from the one or more portions of the workpiece at an angle that is perpendicular to a surface of the workpiece.

The string may also be based upon, at least in part, a concatenation of a plurality of numerical hash values derived from the one or more images, or differences between or among such images. The one or more images may be generated by an imaging device having a radiation sensing element or elements that may consist of a linear array of photosensing elements, a two-dimensional array of photosensing elements, or a single photo-sensing element. The imaging device may generate the images by scanning the one or more portions of the workpiece in accordance with imaging registration or fiducial marks on the workpiece. The photosensing element or elements of the imaging device may be integrated into or comprised within a mechanism for printing the indicium on the workpiece.

Apparatus and methods are also provided which implement aspects of the present invention. One embodiment of an apparatus according to a second aspect of the present invention is used to generate an indicium according to the present invention, and to place the generated indicium on a workpiece; an embodiment of an apparatus according to a third aspect of the present invention is used to analyze a workpiece and an indicium already present on the workpiece to determine whether the workpiece is authentic.

In each of these embodiments of the apparatus according to the second and third aspects of the present invention, the apparatus generates a string for use in determining whether the workpiece is valid. The apparatus includes an electromagnetic radiation source that illuminates one or more portions of the workpiece with electromagnetic radiation from different respective illumination positions relative to the one or more portions of the workpiece. An imaging device comprised in the apparatus generates respective images of surface topographical appearances of the one or more portions of the workpiece, when the one or more portions of the workpiece are illuminated with the radiation. A string generating mechanism generates the string based upon, at least in part, the respective images generated by the imaging device.

Thus, in accordance with the present invention, determination of validity of the workpiece is based upon random, intrinsic physical characteristics of the workpiece, thereby reducing or eliminating the need to perform database queries of identifying information to make such determinations. Advantageously, this permits the cost of preventing and/or thwarting the aforesaid types of fraud to be reduced compared to the prior art. Additionally, since significant effort is typically required to duplicate the intrinsic workpiece characteristics upon which determination of validity of the workpiece is based, according to the present invention, this makes the perpetration of fraud more difficult and less likely to succeed compared to the prior art. Further advantageously, the technique of present invention permits off-line workpiece and indicia verification and also permits determination of which indicium, among identical indicia, is actually authentic.

These and other features and advantages of the present invention will become apparent as the following Detailed Description proceeds and upon reference to the Drawings, in which:

Although the following Detailed Description will proceed with reference being made to illustrative embodiments and methods of use, it will be appreciated by those skilled in the art that many alternatives, modifications, and variations thereof are possible without departing from the present invention. Thus, it is intended that the present invention should be viewed as encompassing all such alternatives, modifications, and variations as will be apparent to those skilled in the art, and should be defined only as set forth in the hereinafter appended claims.

DETAILED DESCRIPTION OF ILLUSTRATIVE EMBODIMENTS

Figure 1:
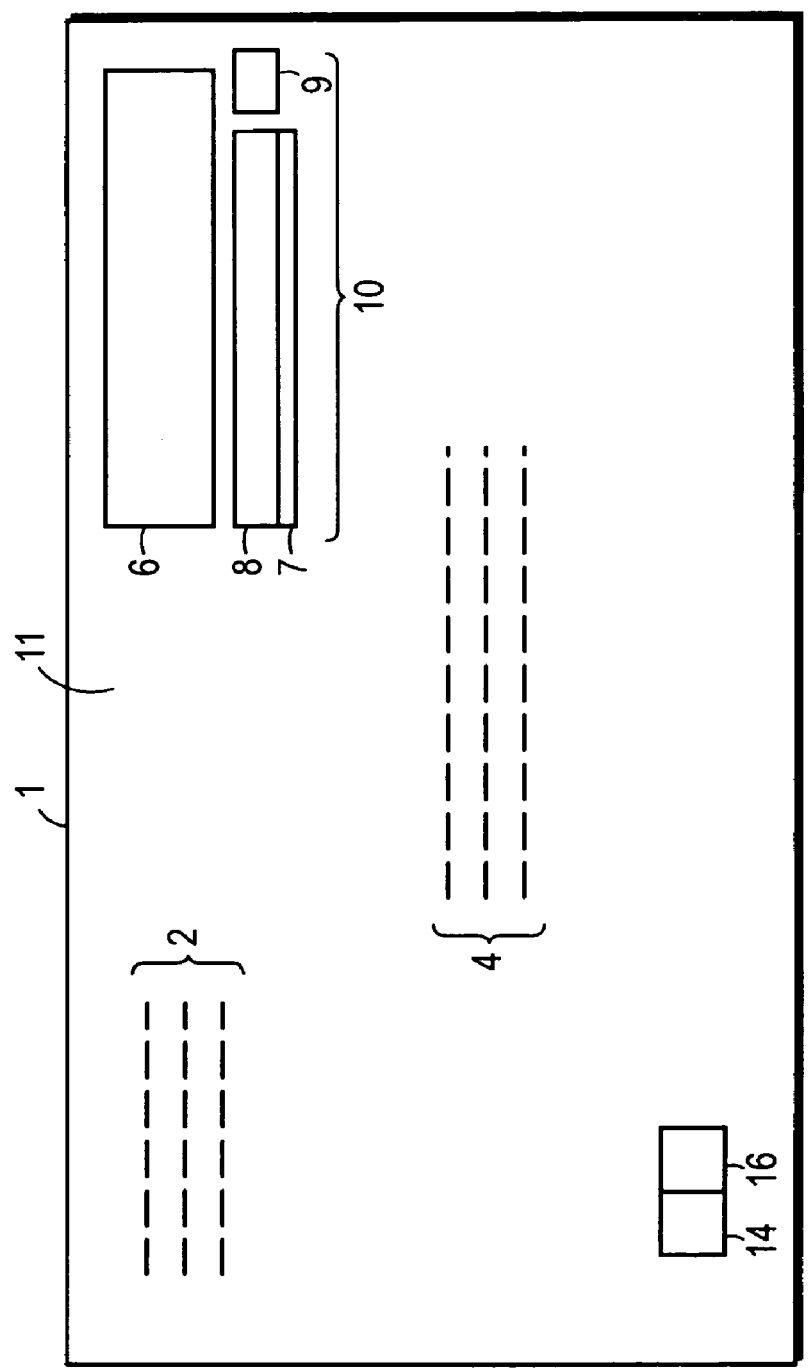
FIG. 1 is a highly schematic representation of the layout and elements comprised in a front surface of a mailpiece having one embodiment of an indicium in accordance with the first aspect of the present invention.
Figure 2:
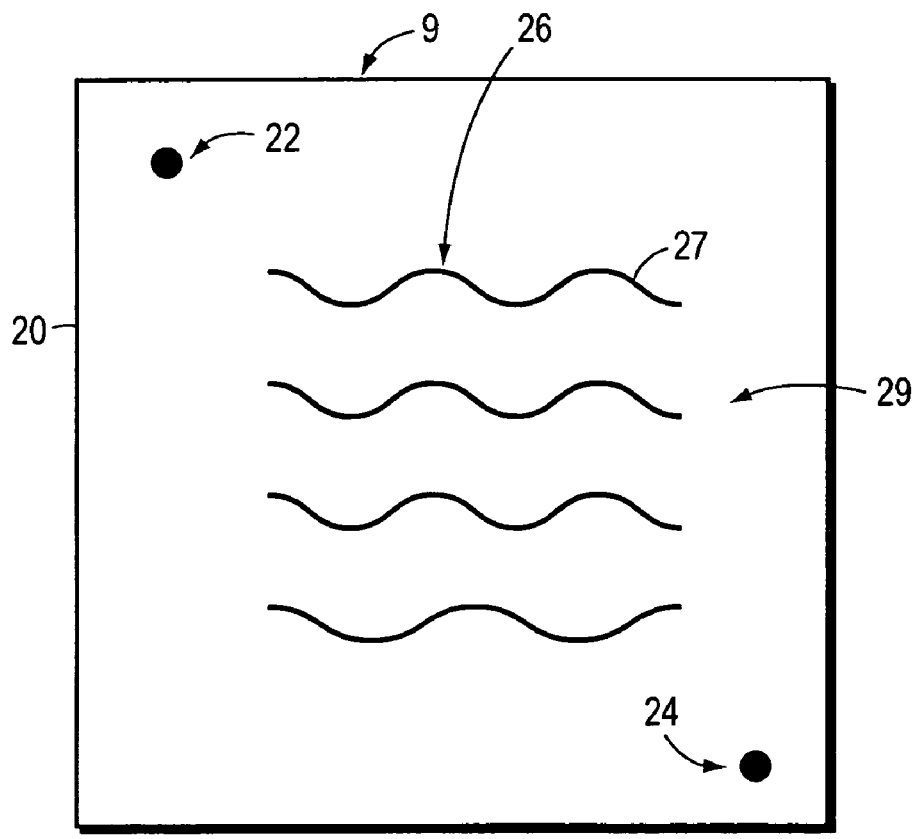
FIG. 2 is a highly schematic representation of a portion of the mailpiece of FIG. 1.

With reference being made to FIGS. 1–7, illustrative embodiments of aspects of the present invention will now be described. FIGS. 1–2 illustrate features of a workpiece 1 that includes one embodiment of an authentication indicium 10 made according to one aspect of the present invention. More specifically, in FIGS. 1–2, workpiece 1 is a postal mailpiece that comprises a postal envelope whose front outer surface 11 includes indicium 10. Surface 11 also comprises written postal source address 2 (i.e., of the sender of mailpiece 1) and destination address 4 (i.e., of the intended recipient of mailpiece 1) in the upper left corner and center, respectively, of the surface 11 of mailpiece envelope 1. A postal symbol or artistic graphic 6 may also be placed on the surface 11 (e.g., in the upper right corner of surface 11 above the indicium 10, as shown in FIG. 1).

In accordance with this embodiment of this aspect of the present invention, indicium 10 includes respective markings 7, 8 provided on surface 11 of the envelope 1. Markings 7 comprises a human-readable alphanumeric text disclosing to a human reader information that is pertinent to the mailpiece 1, such as, the amount of postage that has been paid to post the mailpiece 1 and the city and/or country from which the mailpiece 1 is being posted. Markings 8 are a uni- or multi-dimensional bar code and/or sequence of human-readable digits that correspond to or represent a cryptographic signature, and/or a numeric or alphanumeric string. As will be described more fully below, markings 8 of indicia 10 may be used, in accordance with aspects of the present invention, to determine validity of the workpiece 1.

As shown in FIG. 2, markings 9 comprise a fiducial square or box 20 that encloses a portion 29 of the surface 11 of workpiece 1, and two fiducial points or dots 22, 24 therein adjacent respective, diagonally-opposite corners of box 20. Each of the dots 22, 24 is spaced away from a respective corner of the box 20 by a respective, identical distance.

Figure 3:
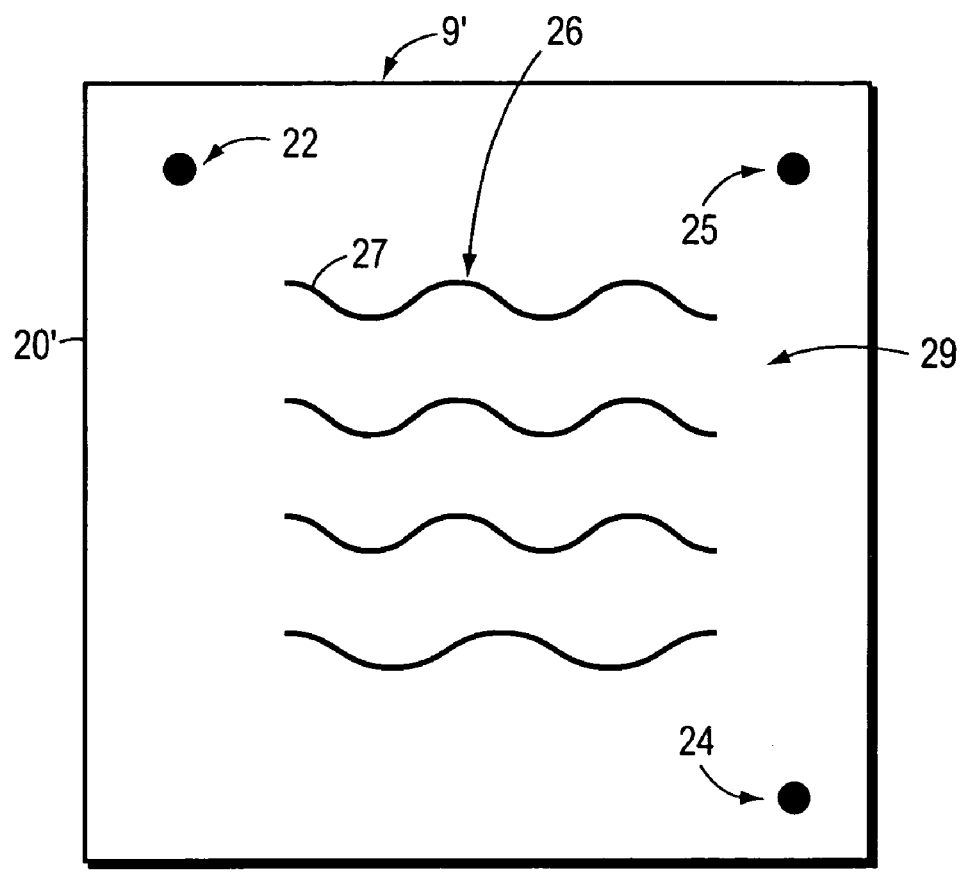
FIG. 3 is a highly schematic representation of a variation of the portion of the workpiece shown in FIG. 2.

Alternatively, as is shown in FIG. 3, marking 9 may be replaced with markings 9'. Markings 9' include a fiducial square or box 20' that encloses a portion 29 of the surface 11 of workpiece 1, and three fiducial dots 22, 24, 25. The dots 22, 24, 25 are respectively located adjacent respective corners of the box 20'. More specifically, each of the dots 22, 24, 25 is spaced away from a respective corner of the box 20' by an identical, respective distance. Additionally, the distance between dots 22 and 25 is the same as the distance between dots 24 and 25, respectively.

As noted previously, markings 8 correspond to or are representative of a unique cryptographic signature, and/or numeric or alphanumeric string. The signature may be the result of encrypting this string using one cryptographic key of a private/public cryptographic key pair of a CA (e.g., a governmental authority, such as the U.S. Postal Service) that can be used to determine validity of the string, using the other key from the key pair, using well known conventional private/public key encryption techniques.

As will be described more fully below, if the mailpiece is valid/authentic, the string being represented by or corresponding to the markings 8 is based upon, at least in part, certain random, intrinsic physical characteristics (symbolically referred to by numeral 26) of the portion 29. These physical characteristics 26 include respective images (referred to by numeral 47) of surface topographical appearances (symbolically referred to by numeral 27) of the portion 29 that result when portion 29 is illuminated with electromagnetic radiation R from respective different illumination positions 70, 72, 74 relative to portion 29 (see, FIGS. 4–7). That is, as will be described more fully below, the string represented by or corresponding to markings 8 is based upon or derived from respective images 47 of surface topographical appearances 27 of the portion 29 that result when portion 29 is illuminated with electromagnetic radiation R originating from respective positions 70, 72, 74 relative to the portion 29. As used herein, the term "image" may include any combination of one- and/or two-dimensional samplings of reflected radiation from the surface 11.

These surface topographical appearances 27 include details of certain microscopic phenomena that are random and result from intrinsic three dimensional properties of the surface 11 in portion 29. Such microscopic phenomena may include e.g., the appearances of and/or structures associated with mountains, craters, material configurations, and fiber configurations of the physical elements comprising portion 29.

The string comprises a numerical hash value that is computed using a predetermined hashing algorithm that operates upon numerical values representative of the images 47. Ideally, the algorithm should be selected such that it generates identical respective hash values when supplied with identical respective groups of images 47.

One example of such a hashing algorithm is the identity function. That is, images 47 may be converted into respective sets of numerical values (i.e., digitized), the sets of numerical values may be concatenated with each other, and the value of the resulting concatenation may serve as the hash value. In practice, however, it will usually be desirable to employ a hashing algorithm that compresses (i.e., reduces the amount of data comprised in the sets of numerical values). For example, binary thresholded versions of the sets of numerical values may be concatenated to form the hash value, although typically much more compression will be desired. Alternatively, the sets of numerical values may be compressed with a lossy compression algorithm, such as JPEG or wavelet compression, and concatenated. Also alternatively, in practice, a small number of coefficients from discrete cosine transforms, discrete Fourier transforms, or wavelet transforms of the sets of numerical values may be used to form the hash value.

Further alternatively, the hash value may be generated using an algorithm that first extracts from the digitized images respective rectangular image portions of predetermined size (e.g., respective digitized image data corresponding to the respective image regions). These image regions may be 10 pixel rows by 200 pixel columns in size. Each of the image portions may then be scaled to a desired size, and undergo low pass filtering that permits verification using the ultimately-generated hash value to be less sensitive to noise-related errors. This low pass filtering may comprise a transverse low pass filtering which is accomplished by averaging pixel illumination values in respective columns along respective columns of the respective scaled images, and using the average pixel illumination values generated as values for pixels in a resulting transversely low pass filtered image. More specifically, the respective average pixel values are used as the respective values of pixels in the filtered image that correspond to the respective first pixel values in the respective columns used to generate the average pixel values. The averaged columns may each have the same size (e.g., 10 pixel values). Respective corresponding regions are then extracted from the transversely low pass filtered images (e.g., corresponding regions of 1 pixel by 100 pixels). These extracted regions then undergo a longitudinal high pass filtering. The high pass filtering may be accomplished by longitudinally low pass filtering the extracted regions and then subtracting corresponding pixel values of the longitudinally low pass filtered images from the respective, original extracted regions from which they were generated. The resulting high pass filtered images may then undergo binary thresholding, and the respective numerical values generated therefrom may be concatenated to form the hash value.

In order to decrease the size of the resulting hash value, and increase the discriminatory power of each bit of the hash value a majority of the pixels comprising the images 47 may be ignored when calculating the hash value. For example, the images may be broken down into groups of contiguous pixels (e.g., 5 contiguous pixels), and in each such pixel group, only a single corresponding pixel may be used in generating the hash value.

Additional techniques for generating the hash value include basing the hash value upon pairwise differences of corresponding pixel illumination values of pairs of images, sequential differences of these corresponding illumination values, and/or principle components representations of the images.

Figure 4:
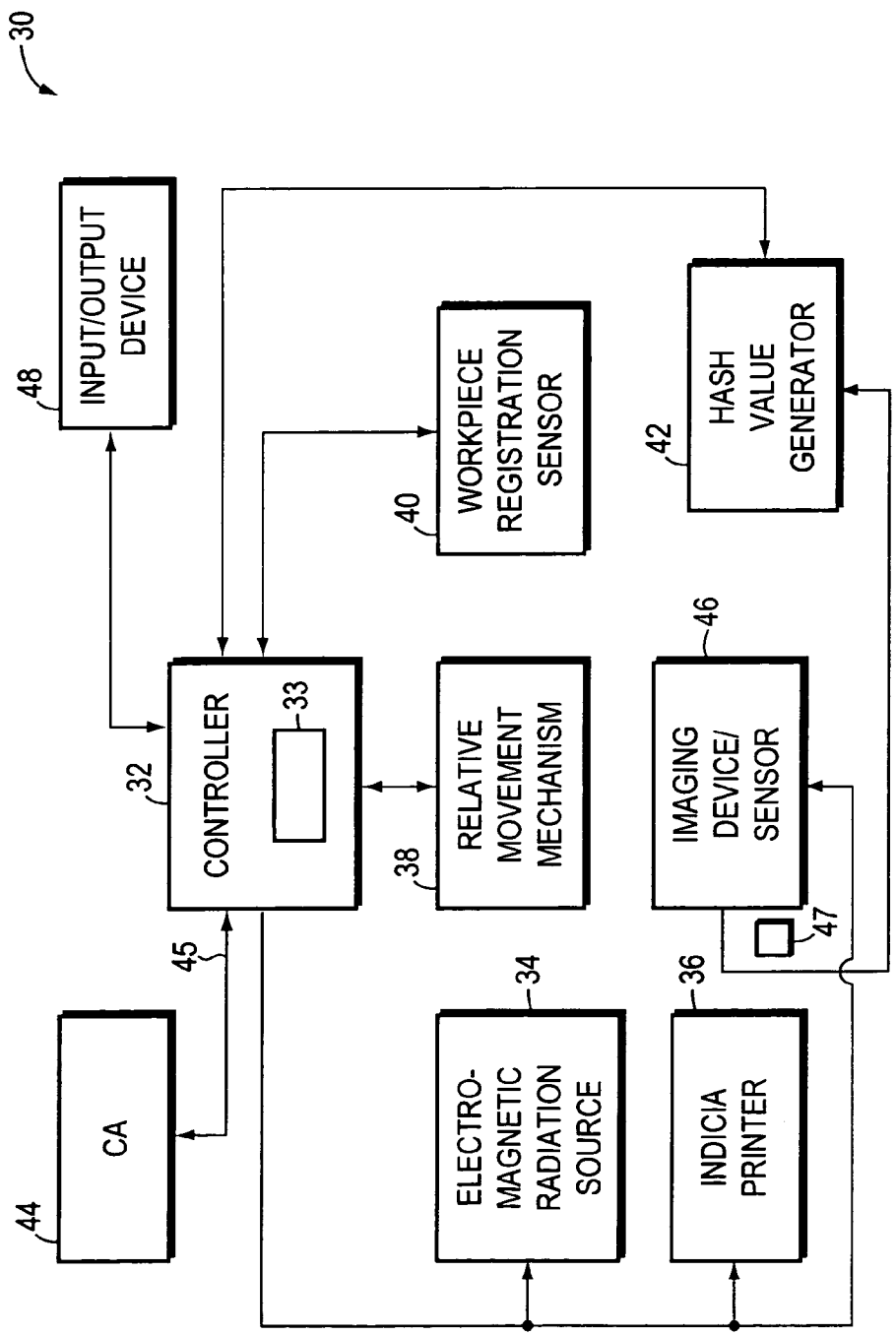
FIG. 4 is a highly schematic diagram illustrating the construction of one embodiment of an apparatus according to the second aspect of the present invention.

FIG. 4 is a highly schematic diagram of one embodiment of an apparatus 30 for generating and placing marks 7, 8 of indicium 10 on surface 11 of envelope workpiece 1. As shown in FIG. 4, apparatus 30 includes controller 32. Controller 32 includes computer-readable memory 33 (e.g., comprising random access, read-only, and/or mass storage memory) for storing software programs and associated data structures for execution by one or more processors also comprised in controller 32 and/or other elements of apparatus 30. When executed by the one or more processors in apparatus 30, the software programs and data structures cause the controller 32 and other elements of apparatus 30 to carry out and/or implement the techniques, functions, and operations described herein as being carried out and/or implemented by controller 32 and other elements of apparatus 30. It will be apparent to those skilled in the art that many types of computer processors and memories may be used in controller 32 without departing from the present invention. For example, controller 32 may comprise one or more Intel 80×86-type processors and associated memory.

User input/output device 48 comprises a conventional mechanism for interfacing a human user (not shown) to the controller 32 so as to permit the user to control and monitor operation of apparatus 30. Device 48 may include, for example, one or more conventional computer-user interface devices, such as pointing and keyboard input devices, and a display output device which together permit the human user to input commands to controller 32 to be performed by apparatus 30, and to receive from controller 32 indication of receipt and progress of apparatus 30 in executing the input commands.

Apparatus 30 also includes a mechanism 38 for receiving the envelope 1 and for moving the envelope 1, once received, so as to position the envelope 1 relative to an electromagnetic radiation source 34 and imaging device 46 in such a way as to permit generation of images 47 by device 46. More specifically, mechanism 38 comprises conventional electromechanical components that permit the envelope 1 to be physically inserted into mechanism 38, and thereafter, to be moved relative to source 34 and device 46, in the following manner.

After envelope 1 is physically inserted into mechanism 38, mechanism 38 signals controller 32 that envelope 1 has been received by mechanism 38. In response to this signal from mechanism 38, controller 32 activates registration sensor 40. Sensor 40 comprises conventional components for optically scanning the envelope surface 11 and for determining based upon such optical scanning the position and orientation of registration marks 9 relative to the source 34 and device 46. At periodic time intervals after its activation, sensor 40 provides to controller 32 information concerning the position and orientation of the marks 9 relative to the source 34 and device 46 from which controller 32 may determine the registration of the portion 29 relative to the source 34 and device 46. Controller 32 provides commands to mechanism 38 that cause mechanism 38 to move the envelope 1 relative to the source 34 and device 46 such that the source 34 and device 46 are brought into an initial predetermined registration relative to the portion 29.

In this initial registration, the source 34 is positioned at position 70 relative to the surface 11 of portion 29 in which an electromagnetic beam of illuminating radiation R may be emitted from the source 34 at an oblique elevation angle relative to the surface 11 of portion 29, and at an azimuthal angle of zero relative to the portion 29. Also, in this initial registration, the centroid of radiation sensing element(s) of the device 46 is positioned directly above the centroid of the portion 29. That is, device 46 comprises one or more radiation sensing elements that may include, e.g., a two-dimensional imaging camera, a linear array of photosensing elements (e.g., charge coupled devices) or a single such element. In this initial registration, if the device 46 comprises a two-dimensional array of sensors, the centroid of the radiation sensing elements of device 46 is positioned directly above the centroid of the portion 29.

After the source 34 and device 46 are in this initial registration relative to the portion 29, the controller 32 causes the source 34 to emit a beam R of illuminating radiation which strikes the surface 11 of portion 29. A portion P of the radiation beam R is reflected from the surface 11 of portion 29 at an angle that is normal (i.e., perpendicular) to portion 29. This portion P of the radiation beam R is received by the sensing element(s) of device 46, which generate from portion P an image of the surface topographical appearance 27 of the portion 29. Device 46 then digitizes this image and supplies the digitized image to hash value generator 42. Generator 42 then stores the digitized image in a computer-readable memory (not shown), and indicates to controller 32 that it has received and stored the digitized image.

Controller 32 then causes mechanism 38 to change the registration of portion 29 relative to the source 34. In this changed registration, the source 34 is positioned in position 72, wherein yet another radiation beam R may be emitted from the source 34 at the oblique angle of elevation relative to the surface 11 of portion 29 and at an azimuthal angle of 90 degrees relative to the portion 29. In this changed registration, if the device 46 comprises a two-dimensional array of sensors, the centroid of the radiation sensing element(s) of the device 46 is positioned directly above the centroid of the portion 29, and the registration of the sensing element(s) relative to the portion 29 is unchanged from the initial registration.

Controller 32 then causes source 34 to emit another radiation beam R, which strikes portion 29 such that a portion P of the beam R is reflected from the surface 11 and is received by the device 46. Device 46 converts this portion P into another image of the surface topographical appearance of the portion 29, and digitizes this image. The digitized image is then transmitted to the hash value generator 42, which stores the digitized image and indicates to the controller 32 that it has received and stored the digitized image.

Controller 32 then causes mechanism 38 to change the registration of portion 29 relative to the source 34. In this changed registration, the source 34 is positioned in position 74, wherein yet another radiation beam R may be emitted from the source 34 at the oblique angle of elevation relative to the surface 11 of portion 29 and at an azimuthal angle of 180 degrees relative to the portion 29. In this changed registration, the centroid of the radiation sensing element(s) of the device 46 is positioned directly above the centroid of the portion 29, and the registration of the sensing element(s) relative to the portion 29 is unchanged from the initial registration. Controller 32 then causes source 34 to emit yet another beam of radiation R such that beam R strikes portion 29 and a portion P of the beam R is reflected from the surface 11 of portion 29 and is received by the light sensing element(s) of device 46. Imaging device 46 converts this reflected portion P of radiation beam R into another image of the surface topographical features 27 of portion 29. This image is then digitized and transmitted to generator 42 which stores the image.

After generator 42 has stored three images of respective surface topographical appearances of portion 29 that resulted when source 34 illuminated portion 29 with radiation from three respective azimuthal angles relative to the portion 29 (i.e., corresponding to source positions 70, 72, and 74), generator 42 generates from the three images a hash value, using one of the previously described hash value generation algorithms. The hash value generated by generator 42 is then transmitted to controller 32.

Controller 32 then retrieves from the memory 33 a previously stored identification number that is used to identify the apparatus 30, and receives from the I/O device 48 a user-inputted postage value for the mailpiece 1. Controller 32 then concatenates the hash value with the apparatus identification number and the user-inputted postage value, in a predetermined fashion, so as to enable each of these values (i.e., the hash value, apparatus identification number, and postage value) to be extracted from the resultant concatenation when a predetermined extraction algorithm is applied to the resultant concatenation. Other values may also be so concatenated with the hash value (e.g., indicium version number, algorithm identification number, certificate and postal service device serial number, manufacturer identification number, apparatus model identification number, date of posting, ascending and descending register value, license post office zip code, apparatus software version identification number, destination delivery point code, and/or mail category/class code). The controller 32 then causes printing mechanism 36 to print markings 8 on surface 11 that correspond to or represent the resultant concatenation of the apparatus identification number, postage value, and hash value. The string once generated may be uploaded to the certifying authority 44 via network 45. The certifying authority 44 may then cryptographically sign the string provided to it by the controller 32 of apparatus 30, and may return the cryptographically signed string to the controller 32 via the network 45. Alternatively, if the controller 32 and memory 33 of apparatus 30 are tamper-resistant, the cryptographic key used to sign the string may be stored in memory 33. Controller 32 may then cause print mechanism 36 to print marks 8 onto surface 11 that correspond to or represent the cryptographically signed concatenation and decrement a maximum postage value stored in the tamper-resistant memory. Controller 32 may also cause printer 36 to place marks 7 onto the surface 11 of the mailpiece 1; the information represented by the one or more marks 7 may be supplied to the controller 32 by a human user via device 48 and/or may be prestored in memory 33 and retrieved therefrom by controller 32. The information comprised in the string may be transmitted to the CA for storage in a database for use in ensuring that the purchaser of postage is properly charged for the postage being used to post the mailpiece 1, and for other purposes that will be described below. Alternatively, or in addition thereto, the user of apparatus 30 may be required to log onto network 45 and to provide via network 45 information necessary to ensure identity of the user and the postage value prior to receiving the signed string from the CA to ensure proper charging of the postage to the user.

As stated previously, markings 8 may comprise uni- or multi-dimensional barcodes and/or one or more human-readable sequences of digits. Alternatively, or in addition thereto, markings 8 may comprise one or more spread-spectrum markings wherein information from which the string, cryptographic signature of the string, and/or constituent portions thereof may be obtained, is "hidden", and retrievable therefrom in accordance with the teachings of copending U.S. Provisional Patent Application Ser. No. 60/139,758, entitled "Information Hiding" filed Jun. 15, 1999, and commonly owned with the subject application; the entirety of the disclosure of said copending application is incorporated into the subject application by reference.

Registration marks 9 may be placed on surface 11 by the manufacturer of the mailpiece 1 (i.e., prior to processing of the mailpiece 1 by apparatus 30). Alternatively, if appropriately modified, apparatus 30 may be configured to print the registration marks 9 at a predetermined location (i.e., the location that comprises portion 29) on surface 11, using printing mechanism 36. That is, the apparatus 30 may generate the images 47 and may then bring marks 9 so as to delimit the portion 29 of the workpiece 1 from which the images 47 were generated. Also alternatively, if apparatus 30 is appropriately modified, images 47 may be of topographical appearances of a plurality of different portions 14, 16, 29 of the envelope 1.

Depending upon the type of imaging device 46 used in apparatus 30, the device 46 may generate the images 47 by scanning the portion 29 in a direction from one predetermined registration dot (e.g., dot 22) to another dot (e.g., dot 24). Alternatively, if the device 46 comprises a linear array of photo-sensors or a single photosensing element, the device 46 may separately scan "strips" or contiguous two-dimensional regions of the portion 29 and may generate respective composite images from which the hash value may be generated. Also, the illumination strength (i.e., amplitude) of the beam R may be adjusted so as to be equal to an empirically-determined "optimal" illumination strength (i.e., an illumination strength that provides an image with maximum contrast).

Figure 5:
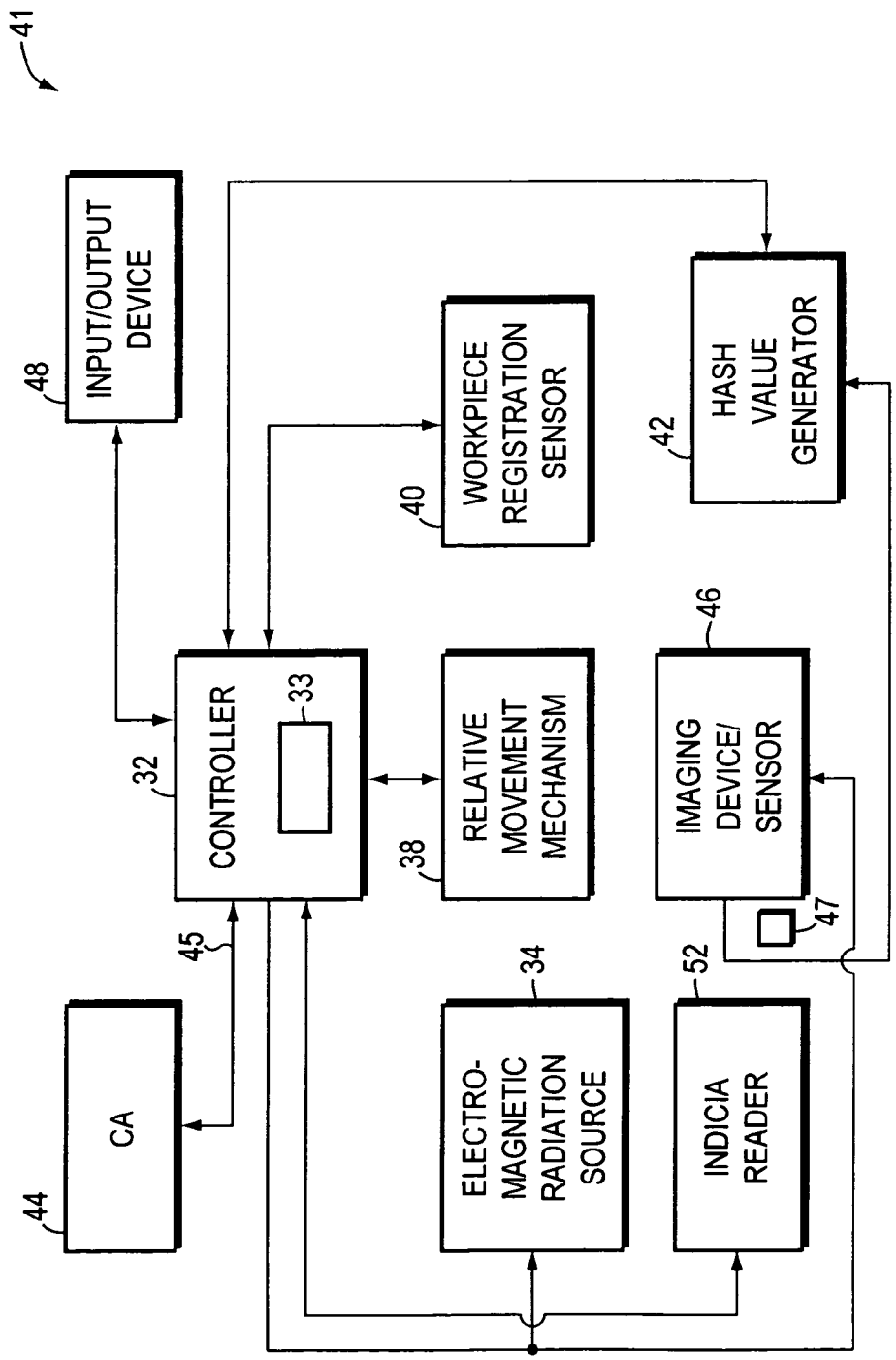
FIG. 5 is a highly schematic diagram illustrating the construction of one embodiment of an apparatus according to the third aspect of the present invention.
Figure 6:
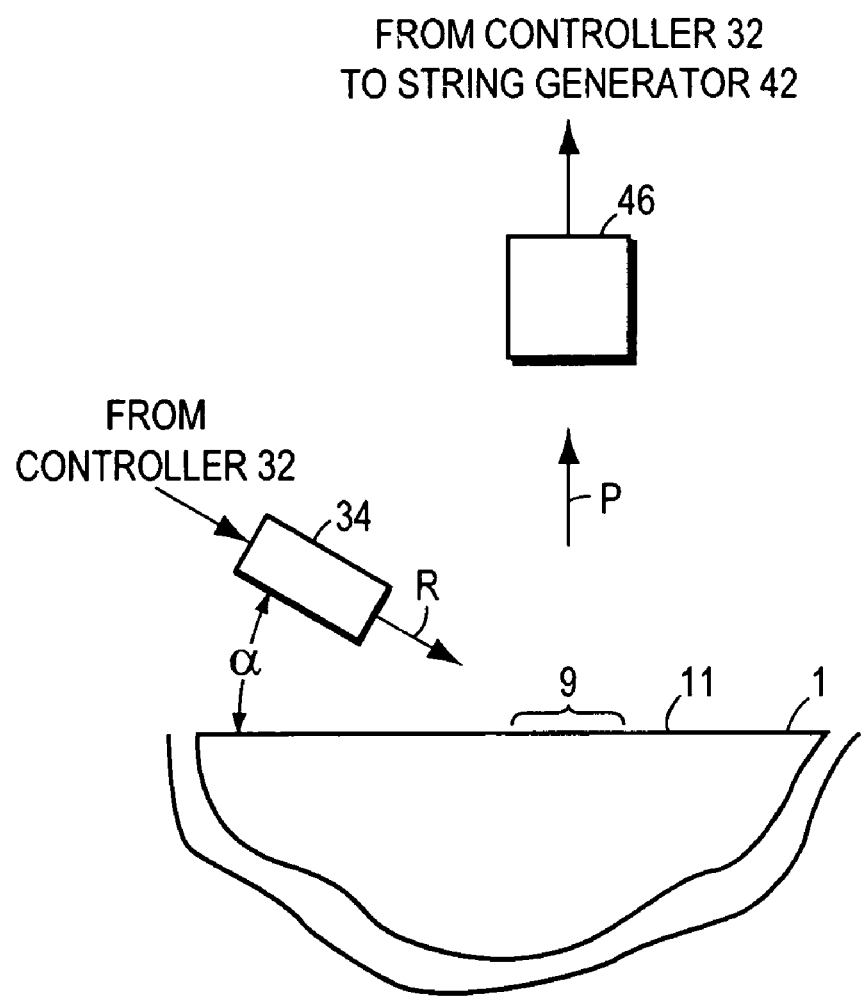
FIGS. 6 and 7 are highly schematic diagrams illustrating positions of elements of the apparatus of FIGS. 4 and 5 relative to the mailpiece of FIG. 1 when the apparatus are in use.
Figure 7:
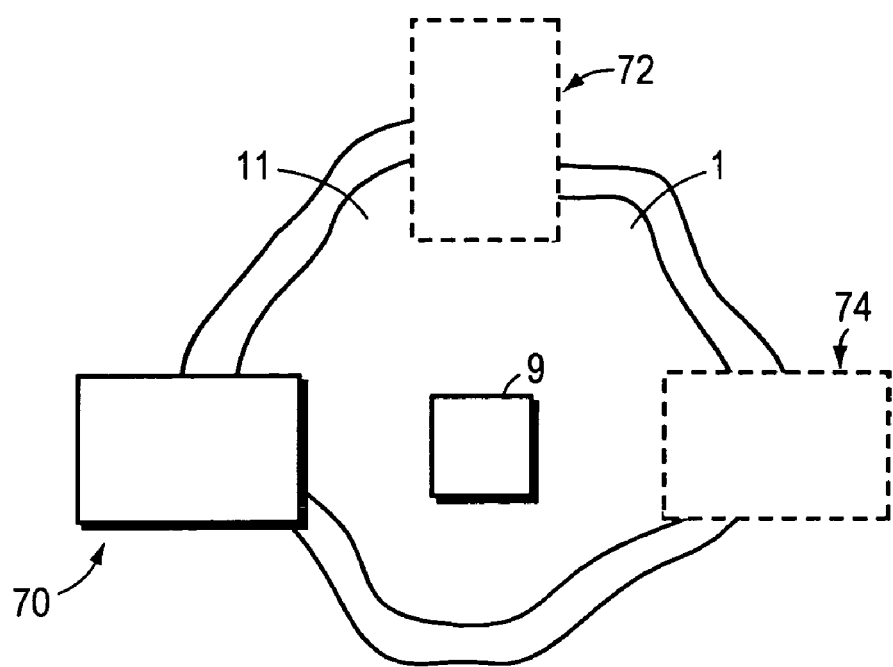

FIG. 5 is a highly schematic diagram of an apparatus 41 for validating/authenticating a mailpiece purporting to have an indicium according to the first aspect of the present invention. It should be understood that unless specifically stated to the contrary, the components and operation of like-numbered elements of apparatus 30 and 41 are substantially identical. Apparatus 41 generates the hash value by illuminating and imaging the mailpiece 1 in the same way as apparatus 30. Once generated by generator 42, the hash value is supplied to controller 32 of apparatus 41. Controller 32 of apparatus 41 stores the hash value from generator 42 in memory 33 of apparatus 41. Controller 32 then causes indicia reader 52 (e.g., comprising a conventional optical scanning system) to scan the marks 8 and to generate therefrom a digitized image of marks 8 that is supplied to controller 32 of apparatus 41. Using conventional optical character and/or barcode recognition techniques, and/or the spread-spectrum information retrieval techniques from the aforesaid commonly-owned provisional application, the controller 32 generates from the digitized image from reader 52 the string and/or cryptographic signature of the string corresponding to or represented by marks 8.

The controller 32 then may extract from the thus generated string the hash value, postage value, and apparatus identification number concatenated therein; controller 32 may then compare the extracted hash value with the hash value stored in memory 33 that was provided to controller 32 from generator 42 of apparatus 41. If the two hash values match within a predefined tolerance, the controller 32 may output to a human operator via the device 48 an indication that the mailpiece 1 should be considered valid; if the two hash values do not match within a predefined tolerance, the controller 32 may provide the opposite indication to the operator or to automatic sorting equipment.

Alternatively, or in addition thereto, controller 32 of apparatus 41 may obtain from certifying authority 44 a cryptographic key that is expected to be able to verify the signature (i.e., the cryptographic key in the public/private key pair that is not the key that is expected to have been used to generate the cryptographic signature). The controller 32 of apparatus 41 may then use the retrieved cryptographic key to verify the signature. If the digital signature of the string is valid, then the hash value contained in the string is compared with the hash value stored in memory 33 from the generator 42, and if the two hash values match within a predefined tolerance, the controller 32 of apparatus 41 provides to a human operator via device 48 an indication that the workpiece should be considered valid. If the two hash values do not match, however, an opposite indication is provided by the controller 32 to the human user via device 48. The other information contained in the string (i.e., the postage value and apparatus identification number) may also be compared by the controller 32 with corresponding information known to be valid that is supplied to the controller 32 by the operator via device 48 of apparatus 41.

For purposes of the hash value comparisons made by controller 32 of apparatus 41, each hash value being compared may be viewed as a feature vector, and each such comparison may be carried out in the following manner. After normalizing the feature vectors to be compared such that the length of the normalized vectors is unity, the feature vectors may be compared by obtaining an inner product measuring the cosine of the angle between the vectors in a high dimensional feature space. An inner product value that is within a predefined constant threshold for acceptance or rejection, e.g., approximately a constant multiple of unity divided by $\sqrt{N}$ where N is the number dimensions of the feature space, may be defined to indicate that the vectors from which the inner product value was generated are uncorrelated, and thus, that the respective underlying topographical features from which the vectors were created are most likely different from each other. An inner product value near +1 may be defined to indicate the converse. To overcome possible mis-registration, the two hash values may be compared taking into account possible offsets, and the highest resulting inner product correlation score may be used. Depending upon the device 46, the pixel brightness values of the digitized images from device 46 may consist of only positive values. This may cause these images to have large DC offsets (i.e., the zero spatial frequency component of the Fourier transforms of the images used to generate the hash values), which may make this inner product comparison technique inaccurate. In order to improve the accuracy of this comparison technique, the DC offset of the images used to generate the compared hash values should be eliminated. Beyond eliminating the DC component, high pass filtering of the images (or appropriately selecting particular spatial frequency components thereof) generated by device 46 and thresholding the amplitude value associated therewith based upon an empirically determined threshold value (which may usually be zero) may help to improve the accuracy of this technique. Other hash value comparison techniques may alternatively be used by controller 32 of apparatus 41.

For example, depending upon the hash value algorithm employed, instead of comparing the two hash values, the hash value obtained from marks 8 may be parsed and decompressed to obtain images that may be compared directly with the images 47 generated by device 46 of apparatus 41 (i.e., for correlation therewith). Advantageously, this comparison technique may improve comparison consistency and accuracy.

Thus, it is evident that there has been provided in accordance with the present invention, a workpiece authentication technique that fully satisfies the aims and objectives, and achieves the advantages hereinbefore set forth. It will be apparent to those skilled in the art that many alternatives, modifications, and variations of the foregoing illustrative embodiments are possible without departing from the present invention. For example, although the source 34 has been described as moving relative to the portion 29 such that source 34 is positioned at different azimuthal angles, but the same angle of elevation, relative to portion 29, if apparatus 30, 41 are appropriately modified, source 34 may instead move relative to portion 29 such that source 34 is positioned at different angles of elevation, but the same azimuthal angle, relative to the portion 29. Images 47 may be generated when radiation R is emitted from the source 34 when source 34 is in these different elevational angles. Other modifications are also possible.

For example, the source 34 may include multiple light source and/or fiberoptic light emission systems positioned at multiple orientation relative to the workpiece. These systems may be sequentially activated, or alternatively, may be activated simultaneously to provide illumination to the portion 29 from multiple angles/orientations/positions relative to the portion 29 simultaneously.

Also, apparatus 30 may be modified such that controller 32 may cause printer 36 to print on surface 11 markings representative of or corresponding to the hash value generated by generator 42. Such markings may comprise human-readable optical character recognizable sequences of digits, uni- or multi-dimensional barcodes, and/or spread-spectrum markings within which information from which the hash value may be obtained is hidden. Alternatively, the hash value may be provided to an end user from the manufacturer of the envelope via a mass storage memory device (e.g., floppy or optical disc encoded to store the hash value), electronic messages sent to the end user via a communications network, or via interaction with an object identification tag system wherein the hash value is stored (e.g., of the type disclosed in copending U.S. provisional patent application Ser. No. 60/155,495, filed Sep. 23, 1999, entitled "Object Identification Tagging"; this copending application is commonly owned with the subject application and is incorporated herein by reference in its entirety. The end user may then request that the CA sign the hash value (or a concatenation of the hash value with other information, such as a user identification number and postage value) using a cryptographic key of the end user or of the certifying authority 44, and marks representative of or corresponding to the resulting signature may be placed onto surface 11 as marks 8 by a conventional printing system. Advantageously, the end user in this alternative arrangement need not employ an imaging device 46 and source 34 to generate the string and cryptographic signature. This may substantially reduce the cost and simplify the construction of the system used by the end user to generate marks 8. Also advantageously in this alternative, envelopes may be fabricated without preprinted postage values and valid postage may be obtained by the end user.

Additional modifications are also possible. For example, the device 46 may be integrated or comprised in printing mechanism 36 of apparatus 30. Alternatively, the device 46 may comprise a standalone type of imaging device (e.g., digital camera, scanner, etc.) Also, the registration sensor 40 may be comprised or integrated in the imaging device 46.

Further, if appropriately modified, the functionality of apparatus 30 and 41 may be combined and one imaging device 46 may be used both to generate images 47 and to scan the marks 8. Additionally, the apparatus 30 and 41, or functional components thereof, may be comprised in postal mailpiece sorting apparatus. Accordingly, the present invention is intended to be viewed quite broadly, as encompassing all such alternatives, modifications, and variations as may be apparent to those skilled in the art, and as being defined only as forth in the appended claims.

What is claimed is:

1. An indicium for placement on a workpiece for use in determining whether the workpiece is valid, comprising:
   a set of one or more markings corresponding to a string that is based upon, at least in part, intrinsic physical characteristics of at least one portion of said workpiece, said physical characteristics including one or more images of surface topographical appearance of said at least one portion of said workpiece resulting when the at least one portion of said workpiece is illuminated with electromagnetic radiation from different illumination positions relative to said at least one portion,
   the string being further based upon, at least in part, a numerical hash value derived from the one or more images, the value being generated by a process that includes extracting from the one or more images a first image portion scaling the first image portion to generate a scaled image portion, averaging pixel value of the scaled image portion to generate a first filtered image, extracting from the first filtered image a second image portion, averaging pixel values of the second image portion to generate a second filtered image, and subtracting corresponding pixel value of the second filtered image form the second image portion to generate a third filtered image.

2. Apparatus for use in generating a string for use in determining whether a workpiece is valid, comprising:
   an electromagnetic radiation source for illuminating at least one portion of the workpiece with electromagnetic radiation from different illumination positions relative to said at least one portion;
   an imaging device for generating one or more images of surface topographical appearance of said at least one portion when the at least one portion is illuminated with the radiation by the source at the different illumination positions; and
   a string generator that generates the string based upon, at least in part, a numerical hash value derived from the one or more images, the value being generated by a process that includes extracting from the one or more images a first image portion, scaling the first image portion to generate a scaled image portion, averaging pixel values of the scaled image portion to generate a first filtered image, extracting from the first filtered image a second image portion, averaging pixel values of the second image portion to generate a second filtered image, and subtracting corresponding pixel values of the second filtered image from the second image portion to generate a third filtered image.

3. Method for generating a string for use in determining whether a workpiece is valid comprising:
   illuminating at least one portion of the workpiece with electromagnetic radiation from different illumination positions relative to said at least one portion;
   generating one or more images of surface topographical appearance of said at least one portion when the at least one portion is illuminated with the radiation at the different illumination positions;
   filtering the one or more images to produce one or more filtered images in which selected higher spatial frequencies of the one or more images are emphasized and lower frequencies are attenuated to distinguish signal components representing taller and deeper surface topographical features from noise and signal components representing shorter and shallower surface topographical features; and
   generating the string based upon, at least in part, the one or more filtered images, wherein the sting is based upon, at least in part, a numerical hash value derived from the one or more filtered images, the value being generated by a process that includes extracting from the one or more images a first image portion, scaling the first image portion to generate a scaled image portion, averaging pixel values of the scaled image portion to generate a first filtered image, extracting from the first filtered image a second image portion, averaging pixel values of the second image portion to generate a second filtered image, and subtracting corresponding pixel values of the second filtered image from the second image portion to generate a third filtered image.

4. Computer-readable memory comprising computer-executable program instructions for use in generating a string for use in determining whether a workpiece is valid, the instructions when executed causing:
   illumination of at least one portion of the workpiece with electromagnetic radiation from different illumination positions relative to said at least one portion;
   generation of one or more images of surface topographical appearance of said at least one portion when the at least one portion is illuminated with the radiation at the different illumination positions; and
   generation of the sting based upon, at least in part, a numerical hash value derived from the one or more images, the value being generated by a process that includes extracting from the one or more images a first image portion, scaling the first image portion to generate a scaled image portion, averaging pixel values of the scaled image portion to generate a first filtered image, extracting from the first filtered image a second page portion, averaging pixel values of the second image portion to generate a second filtered image, and subtracting corresponding pixel values of the second filtered image from the second image portion to generate a third filtered image.

* * * * *